(No Model.) 3 Sheets—Sheet 1.
W. J. LANE.
MECHANISM FOR CONTROLLING MOTION.
No. 307,663. Patented Nov. 4, 1884.
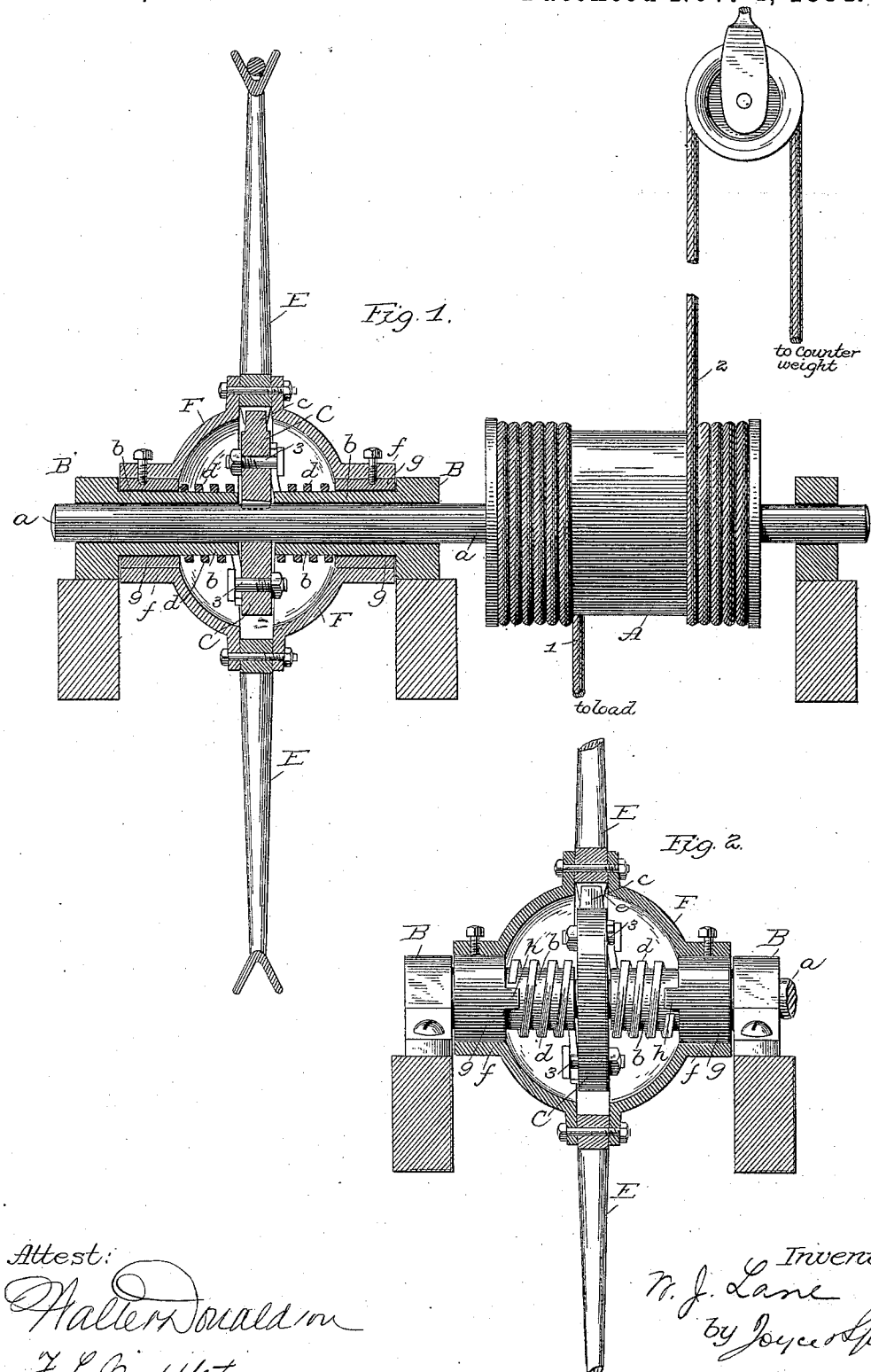
Attest:
Walter Donaldson
F. L. Middleton
Inventor
W. J. Lane
by Joyce & Spear
Atty's

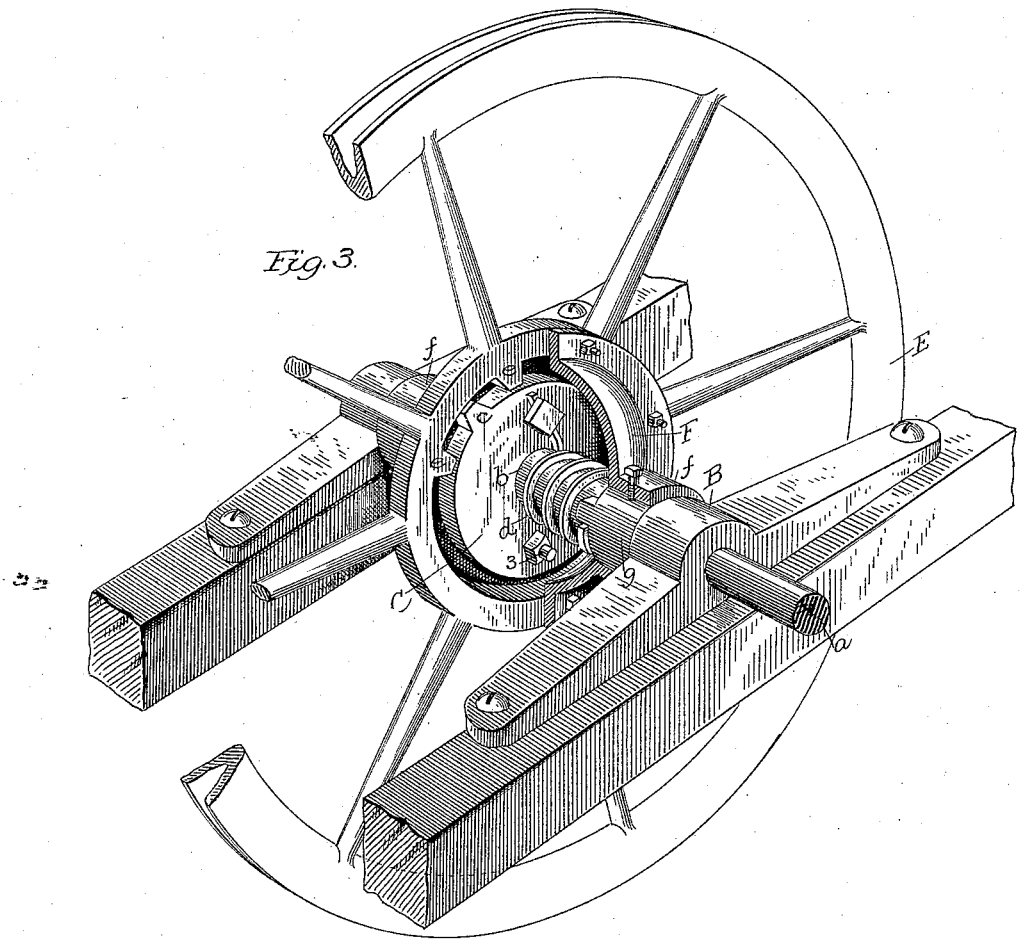

(No Model.) 3 Sheets—Sheet 3.
W. J. LANE.
MECHANISM FOR CONTROLLING MOTION.
No. 307,663. Patented Nov. 4, 1884.
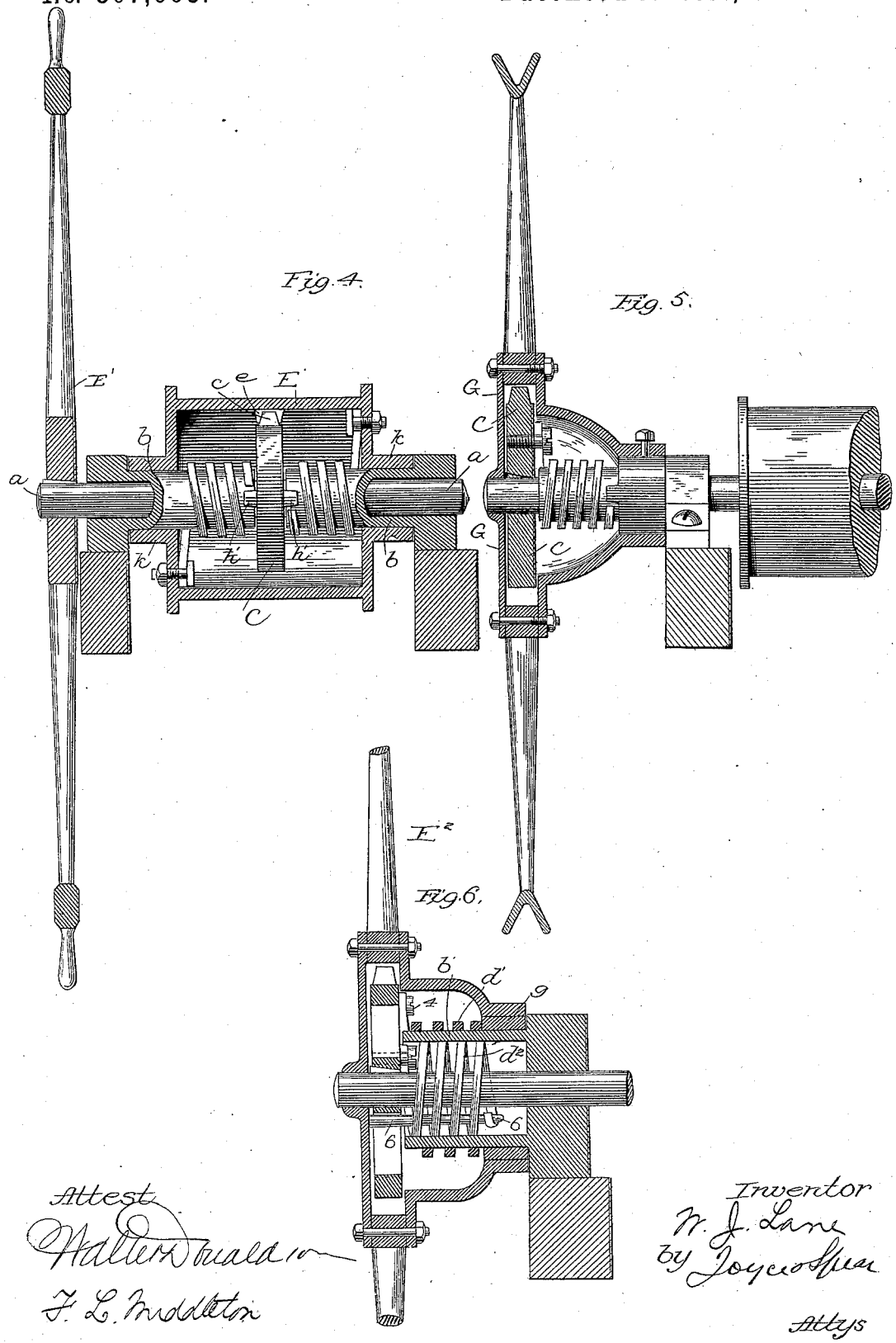

ical section longitudinally of the shaft, with

UNITED STATES PATENT OFFICE.

WILLIAM J. LANE, OF POUGHKEEPSIE, NEW YORK.

MECHANISM FOR CONTROLLING MOTION.

SPECIFICATION forming part of Letters Patent No. 307,663, dated November 4, 1884.

Application filed August 28, 1884. (No model.)

*To all whom it may concern:*

Be it known that I, WILLIAM J. LANE, of Poughkeepsie, in the county of Dutchess and State of New York, have invented a new and useful Improvement in Mechanism for Controlling Motion; and I do hereby declare that the following is a full, clear, and exact description of the same.

My invention is designed mainly for that class of elevating mechanisms or hoists which includes dumb-waiters and elevators adapted to be operated by hand; but it may also be used without regard to the kind of motive power employed.

In elevating mechanisms such as dumb-waiters and smaller hand hoisting apparatus a difficulty is especially liable to occur in arresting the platform or car with its load at any desired point and holding it at that point securely without such a lock or fastening that it cannot be operated at any other point than that where the fastening is made. Such elevators are also liable to "run" when the load is greater or less than the counter-weight.

Brakes and retarders have been heretofore applied to hoisting mechanisms in such manner that the operator controlled the connection between the mechanism through which the power was applied and the hoisting-drum, whereby the parts were locked positively together and the load hoisted, or the load was allowed to slip, at the will of the operator. These are not practicable where the hoisting is done by hand or in like simple apparatus.

The object, therefore, of my invention is to provide means whereby the car, platform, or box of any such hoisting apparatus may be arrested and held at any point and the holding mechanism may be released from any point from which the hoist is operated, and whereby also the car, box, or platform may be lowered or moved by frictional contact and without much effort on the part of the operator, all substantially as hereinafter fully explained.

It consists, first, of a spring-coil interposed between a shaft or drum and a fixed sleeve, and adapted automatically to clutch the sleeve and to release itself on the advance and on the return of the driving-power.

It consists, second, of a spring-coil interposed between a shaft or drum and a fixed sleeve, and adapted automatically to clutch the sleeve, to release itself on the advance and on the return of the driving-power, and devices connected with the driving-power for releasing the clutch of the coil.

It consists, third, of a pair of spring-coils interposed between the drum or shaft and fixed sleeves, bearing on said sleeves, and adapted by direction of coils to lock both ways automatically when the driving-power is discontinued, and means for releasing the coils from the sleeves and moving the shaft or drum.

It consists, fourth, of a wheel fixed on a shaft, a drum or shell turning about said shaft, connection between the fixed wheel and the drum or shell allowing limited movement of the wheel in relation to the shell, a fixed sleeve or sleeves, spring coil or coils connecting wheel or shell to the sleeve or sleeves, and means for releasing the coil or coils.

It consists, fifth, of a spring coil or coils connected to the drum or drum-shaft and encircling fixed sleeves, a wheel fixed on the shaft, having a stud or tooth playing between two teeth or studs on a shell or drum, whereby the driving-power is connected to the shaft or drum, and a projection or projections extending by the free end or ends of the coils and operated by the driving-power to release the coils before forming the connection between the driving-power and the drum or shaft.

It consists, sixth, of a wheel fixed to the drum-shaft, a spring-coil attached to said wheel and encircling a sleeve-extension on the shaft-bearing, a driving-wheel loose on the shaft, a connection between the hub of the driving-wheel, and the wheel fixed on the shaft admitting of some play, and a projection on the hub of the driving-wheel adapted to open or release the coil on reverse movement of the driving-wheel.

My invention consists, seventh, in details of construction, all as hereinafter set forth.

In the accompanying drawings, Figure 1 represents an embodiment of my invention in simple form, the figure showing a central vertical section longitudinally of the shaft, with the shaft and drum in side elevation. Fig. 2 represents part of the same with the hub of the driving-wheel only in section. Fig. 3 shows the same part in perspective. Figs. 4, 5, and 6 represent modifications, all more fully explained hereinafter.

In the drawings, A represents the drum, and *a* the shaft, of a simple hand-hoist, on which is wound a rope, 1, connected to the load, and a rope, 2, connected to counterweight.

I have described the embodiment of my invention, first, with the coils in duplicate or pairs to act in opposite directions; but, as fully explained hereinafter, the coil may be used singly. The bearings B B have sleeve-extensions *b b*, in which the shaft *a* turns. Between the ends of these sleeves is a wheel, C, fixed to the shaft *a*. On each side, as represented in the main figures, is a spring-coil, *d*, encircling the inner ends of the sleeves and made slightly smaller than the sleeve, so as to be in frictional contact therewith. The inner ends of the coils are attached to the wheel C by means of bolts 3, or in any convenient way. The outer ends of the coils are free, as shown in Fig. 2. A hand-wheel is represented at E, the hub of which, F, is hollow, forming a shell which incloses the wheel C. Extensions *f f* of this hub are fixed to and inclose sleeve *g*, which bear upon the sleeve-extension *b* and turn freely on said extension. The wheel C has a single tooth, *c*, which projects between two teeth, *e e*, within the hub F of the wheel E, as shown more clearly in Fig. 3. The two teeth *e e* are placed at a distance apart to allow some play for the tooth *c*, for a purpose hereinafter explained. On each sleeve *g* is a projection, *h*, extending inward across the path of the free end of the coil *d*.

The teeth heretofore described and the projection *h* are so adjusted in relation to each other and to the free ends of the coils that forward movement of the wheel E, which tends to uncoil one coil and tighten the other, will bring the projection *h* on the right-hand side, Figs. 1 and 2, against the end of the coil, causing it to release its grip from the sleeve *b* before the tooth *c* comes into contact with the rear tooth, *e*. The wheel E is then in positive connection with the wheel C, and the wheel C is released from the sleeve *b*, and power continued upon the wheel E is applied to the drum to raise the load. Reverse movement of the wheel E causes the coils and studs to act in the same manner, but in opposite directions.

To explain more particularly, it will be observed by inspection of Fig. 1 that the upper part of the driving-wheel E is brought forward in the direct movement in raising the load. The coils are so applied to the sleeve that this direct movement tends to uncoil the left-hand coil or tighten the other. Reverse movement of the wheel E reverses this operation in respect to the two coils. It will be understood that the coils bear upon the sleeve sufficiently to give an initial friction, so that when the end of the coil attached to the wheel C is advanced its own friction causes it to bear more tightly around the sleeve, and thus its friction is accumulated in the manner well known to those skilled in the art. Normally (that is to say, when the wheel E is at rest) the coils grip the sleeve and hold in both directions. Tendency to move the shaft in either direction will cause the wheel C to draw upon one coil or the other, and this accumulates the friction on one side or the other. Similarly, the reverse movement of the coil ends tends to uncoil or release them from the sleeves, and as the coils on both sides run in the same direction, but are fast at opposite ends, they act in opposite directions, whichever way the wheel is turned. So, also, the stops *h* act in opposite directions. When the wheel E is moved directly to hoist the weight, the movement of the wheel C tends to uncoil the left-hand coil. The movement of the hub of the wheel E carries the right-hand projection *h* against the free end of the right-hand coil, and thus prevents its tendency to bind upon the sleeve. Thus both coils are loosened, and wheel C, and with it the shaft *a*, is free to be carried by the wheel E. When the wheel E is at rest, as before intimated, the projections *h* are out of contact with the ends of the coils, and both coils grip the sleeves and hold in both directions. Suppose, now, that it be desired to lower the load. Reverse movement of the wheel E causes the left-hand projection to strike against the free end of the coil on that side, and, by tending to open it, lessening its grip on the sleeve, causes it to slip and the load to descend. This slipping will occur as long as the reverse movement of the wheel E causes the projection *h* to press against the end of the coil. The coil slips as soon as the frictional contact is lessened sufficiently to be overcome by the load, and the movement is thus made even and continuous, and depends in speed upon the pressure applied by the operator through the wheel E. In this movement the coil on the other side releases itself. The operator may in this way lower the load without any other effort than that which is necessary to open the coil upon one side. As the coil upon one side prevents the load from running backward, so the coil upon the other side will prevent the box, car, or platform from running up by the overweight of the counter-balance when there is no load. Obviously the load will remain at any point where movement of the wheel E is discontinued, and it may be started in either direction from any point where the rope or other moving mechanism may be reached. The coil forms an absolute lock, and connects the load rigidly to the sleeves while the wheel E is at rest, and whether one or two coils be used the first effect of the movement of wheel E is to release the grip of the coils, and then to form a positive connection between the driving-power and the drum.

In Fig. 4 I have shown a modification adapted to ships' steering-gear and like situations where it is desirable to have the wheel on the end of the shaft. In this modification the drum is made to occupy the place of the hollow hub or shell of the wheel E, and is locked in place, while the wheel E is fixed to the end of the shaft and the sleeves $b\ b$ extend from the bearing inward, in the manner heretofore explained. A drum, E', has hubs $k\ k$, which turn on the sleeve-extensions $b\ b$. The spring-coils $d'\ d'$ both coil in the same direction, and the outer ends are attached to the heads of the drum, the inner ends being free. The inner surface of the drum is provided with teeth $e\ e$, (one only being shown,) which operate in connection with the tooth $c$ on the wheel C, in the manner heretofore explained. The free ends of the coils are moved to open the coils by studs $h'\ h'$ on the wheel C. When in normal position, the wheel E being idle, the drum is locked, and movement of the wheel E carries the shaft and wheel C, fixed thereon, with the same effect as in the form heretofore described. Movement of the shaft $a$ one way, carrying the wheel, causes the stud on one side to strike the free end of the coil on that side, when the movement of the wheel would cause it to bind upon the sleeve, while the other coil is moved in a direction calculated to loose it. The action is the same in both directions, and movement of the hand-wheel E' first unlocks the drum and turns it. The drum remains locked in both directions when the hand-wheel is at rest, and the helmsman has no work except to move the wheel.

Fig. 5 shows a modification adapted especially for dumb-waiters and similar situations, and where the hand-wheel should be on the end of the shaft no counter-weight is used, or where the lock is required only against the load. The wheel C is fixed in the shaft, and the shell or hollow hub is precisely like that shown in Fig. 1, except that on one side it is covered by a plate, G, the central boss of which bears on the end of the shaft, the wheel turning on this and on the sleeve. The coil and other parts are the same as in Fig. 1.

Fig. 6 shows a modification in which the driving-wheel is on the end of the shaft and the coils lock in both directions, the modification being adapted to have the drum, wheel, or gear fixed on the shaft, as in Fig. 1. In this the wheel $E^2$ turns on the sleeve $g$, which has a projection. (Not shown, but the same as that shown at $b$ in Fig. 1.) This lies in the path of the free end of a spring-coil, $d'$, the other end of which is attached to the wheel C at 4, the coil clasping the sleeve $b'$. Within this sleeve is another coil, $d^2$, running in the same direction as the first, one end of which is attached to the wheel C. Motion in one direction will cause both the inner and outer coils to expand; but expansion of the outer coil releases it, while expansion of the inner coil tightens it. Thus motion one way tightens the outer and looses the inner, and motion the other way tightens the inner and loosens the outer. A pin, 6, set in the hub of wheel $E^2$, extends through an opening in wheel C and into the path of the bent free end of coil $d^2$, and draws it back instead of pushing, as in the other forms. Thus the shaft is locked in both directions by the two coils when the wheel E is at rest, and the coils are released, one by a pin and the other by a stud, when the wheel is turned in one direction or the other.

I would not be understood as claiming, broadly, a spring-coil encircling a shaft, as such a coil has been before shown, as in the United States patent of Dewey, No. 47,282, of 1865.

What I claim as my invention is—

1. A mechanism for controlling motion, consisting of a spring-coil interposed between the drum-shaft or drum and a fixed sleeve, and adapted automatically to release itself in one direction and to grip the sleeve in the other direction.

2. A mechanism for controlling motion, consisting of a spring-coil interposed between the drum-shaft or drum and the fixed sleeve, and adapted automatically to release itself in one direction and to grip in the other, and means, substantially as described, for releasing the coil.

3. A mechanism for controlling motion, consisting of a pair of spring-coils interposed between the drum-shaft or drum and fixed sleeve or sleeves, said coils being adapted to grip upon the sleeve or sleeves automatically both ways, so as to hold in opposite directions, a driving-wheel having connections with the drum-shaft or drum with a certain amount of play, and devices operated by said wheel for releasing one or the other of the coils, substantially as described.

4. In combination, a wheel, C, fixed to the shaft, and having a single tooth engaging with teeth on a drum or shell, with a certain amount of play between said teeth on the drum or shell, fixed sleeve or sleeves extended from the bearings, spring coil or coils encircling said sleeve or sleeves, fixed at one end and free at the other, and means for releasing said coil or coils, substantially as described.

5. In combination, a drum-shaft, a wheel fixed thereon, a loose driving-wheel having drum or shell inclosing said wheel, with teeth forming a loose engagement with a tooth on the fixed wheel, sleeves extended from the shaft-bearings, spring-coils fixed at one end and loose at the other, gripping in opposite directions and forming clutch-connection between shaft and sleeves, and projections on the hub of the loose driving-wheel extending across the ends of the coils, all substantially as described.

6. In combination, a spring coil or coils connected to the drum or drum-shaft and encircling fixed sleeve or sleeves, a wheel fixed on the shaft, having a tooth in loose engagement with teeth shell or drum, whereby the driving-power is connected to the shaft or drum, and a projection or projections extending by the end or ends of the coil or coils, operated by the driving-power to release the coils before forming positive connection between driving-power and shaft, substantially as described.

7. In combination with a drum-shaft, bearings having sleeve-extensions, a shell or hub, F, and sleeves attached thereto, provided with projections *h*, a wheel, C, fixed to the drum-shaft, and spring-coils attached to the wheel C and coiled about the sleeves to hold in opposite directions, substantially as described.

In testimony whereof I have signed my name to this specification in the presence of two subscribing witnesses.

WILLIAM J. LANE.

Witnesses:
   W. C. DUVALL,
   JAS. D. DUNFORD.